(12) United States Patent
Culp et al.

(10) Patent No.: US 11,247,242 B2
(45) Date of Patent: *Feb. 15, 2022

(54) SYSTEM AND METHOD FOR SORTING ITEMS

(71) Applicant: ALIGN TECHNOLOGY, INC., San Jose, CA (US)

(72) Inventors: James Clete Culp, Pleasanton, CA (US); Stanley E. Sankaran, Granite Bay, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,577

(22) Filed: Sep. 3, 2020

(65) Prior Publication Data

US 2020/0398315 A1 Dec. 24, 2020

Related U.S. Application Data

(63) Continuation of application No. 16/155,519, filed on Oct. 9, 2018, now Pat. No. 10,766,055, which is a continuation of application No. 14/874,083, filed on Oct. 2, 2015, now Pat. No. 10,099,256, which is a continuation of application No. 13/775,692, filed on Feb. 25, 2013, now Pat. No. 9,152,145, which is a
(Continued)

(51) Int. Cl.
*B07C 5/34* (2006.01)
*B07C 3/02* (2006.01)
*G05B 19/418* (2006.01)

(52) U.S. Cl.
CPC .............. *B07C 5/3412* (2013.01); *B07C 3/02* (2013.01); *B07C 5/34* (2013.01); *G05B 19/41865* (2013.01); *Y02P 90/02* (2015.11)

(58) Field of Classification Search
CPC .... B07C 3/00; B07C 3/02; B07C 3/08; B07C 3/082; B07C 3/087; B07C 5/3412; B07C 5/342

See application file for complete search history.

(56) References Cited

U.S. PATENT DOCUMENTS 5,222,855 A   6/1993   Bernard, II et al.
6,533,124 B1  3/2003   Tacito et al.
(Continued)

FOREIGN PATENT DOCUMENTS

DE   19752908   6/1999
EP   0403901    12/1990
(Continued)

OTHER PUBLICATIONS

International Search Report from European Patent Office dated Apr. 10, 2008 for related International Application No. PCT/US2007/082359.
(Continued)

*Primary Examiner* — Charles A Fox
*Assistant Examiner* — Kalyanavenkateshware Kumar
(74) *Attorney, Agent, or Firm* — Fortem IP LLP

(57) ABSTRACT

A system and associated method is provided for sorting parts, which includes a conveyor system for receiving and circulating a plurality of randomly presented parts, a sorting buffer for accumulating selected parts from the plurality of randomly presented parts in an assigned buffer location, and a sequencing system for sequencing the accumulated selected parts.

29 Claims, 10 Drawing Sheets

Related U.S. Application Data continuation of application No. 13/209,222, filed on Aug. 12, 2011, now Pat. No. 8,383,977, which is a continuation of application No. 11/553,330, filed on Oct. 26, 2006, now Pat. No. 8,030,588.

(56) References Cited

U.S. PATENT DOCUMENTS

| | | | |
|---|---|---|---|
| 6,610,954 | B2 | 8/2003 | Takizawa |
| 6,762,383 | B2 | 7/2004 | Morito |
| 7,118,034 | B2 | 10/2006 | Baldassari et al. |
| 2003/0038065 | A1 | 2/2003 | Pippin et al. |
| 2003/0116479 | A1 | 6/2003 | Morito |
| 2003/0155282 | A1 | 8/2003 | Kechel |
| 2005/0082703 | A1 | 4/2005 | Wrosz et al. |
| 2005/0099292 | A1 | 5/2005 | Sajkowsky |
| 2006/0021917 | A1 | 2/2006 | Reinking |

FOREIGN PATENT DOCUMENTS

| | | |
|---|---|---|
| WO | WO00/48909 | 8/2000 |
| WO | WO01/02251 | 1/2001 |

OTHER PUBLICATIONS

International Preliminary Report on Patentability from International Bureau of WIPO for related International Application No. PCT/US2007/082359.
Office Action from USPTO dated Apr. 2, 2009 for related U.S. Appl. No. 11/553,330.
Final Office Action from USPTO dated Oct. 21, 2009 for related U.S. Appl. No. 11/553,330.
Office Action from USPTO dated Oct. 5, 2010 for related U.S. Appl. No. 11/553,330.
Final Office Action from USPTO dated Mar. 16, 2011 for related U.S. Appl. No. 11/553,330.
Notice of Allowance from USPTO dated Jun. 10, 2011 for related U.S. Appl. No. 11/553,330.
Office Action from USPTO dated Jun. 20, 2012 for related U.S. Appl. No. 13/209,222.
Notice of Allowance from USPTO dated Oct. 30, 2012 for related U.S. Appl. No. 13/209,222.
Office Action from USPTO dated Oct. 7, 2013 for related U.S. Appl. No. 13/775,692.
Office Action from USPTO dated May 27, 2014 for related U.S. Appl. No. 13/775,692.
Final Office Action from USPTO dated Dec. 18, 2014 for related U.S. Appl. No. 13/775,692.
Notice of Allowance from USPTO dated Jun. 3, 2015 for related U.S. Appl. No. 13/775,692.
Office Action from USPTO dated Jul. 7, 2017 for related U.S. Appl. No. 14/874,083.
Final Office Action from USPTO dated Jan. 9, 2018 for related U.S. Appl. No. 14/874,083.
Notice of Allowance from USPTO dated Jun. 14, 2018 for related U.S. Appl. No. 14/874,083.
Office Action from USPTO dated Oct. 22, 2019 for related U.S. Appl. No. 16/155,519.
Notice of Allowance from USPTO dated May 7, 2020 for related U.S. Appl. No. 16/155,519.

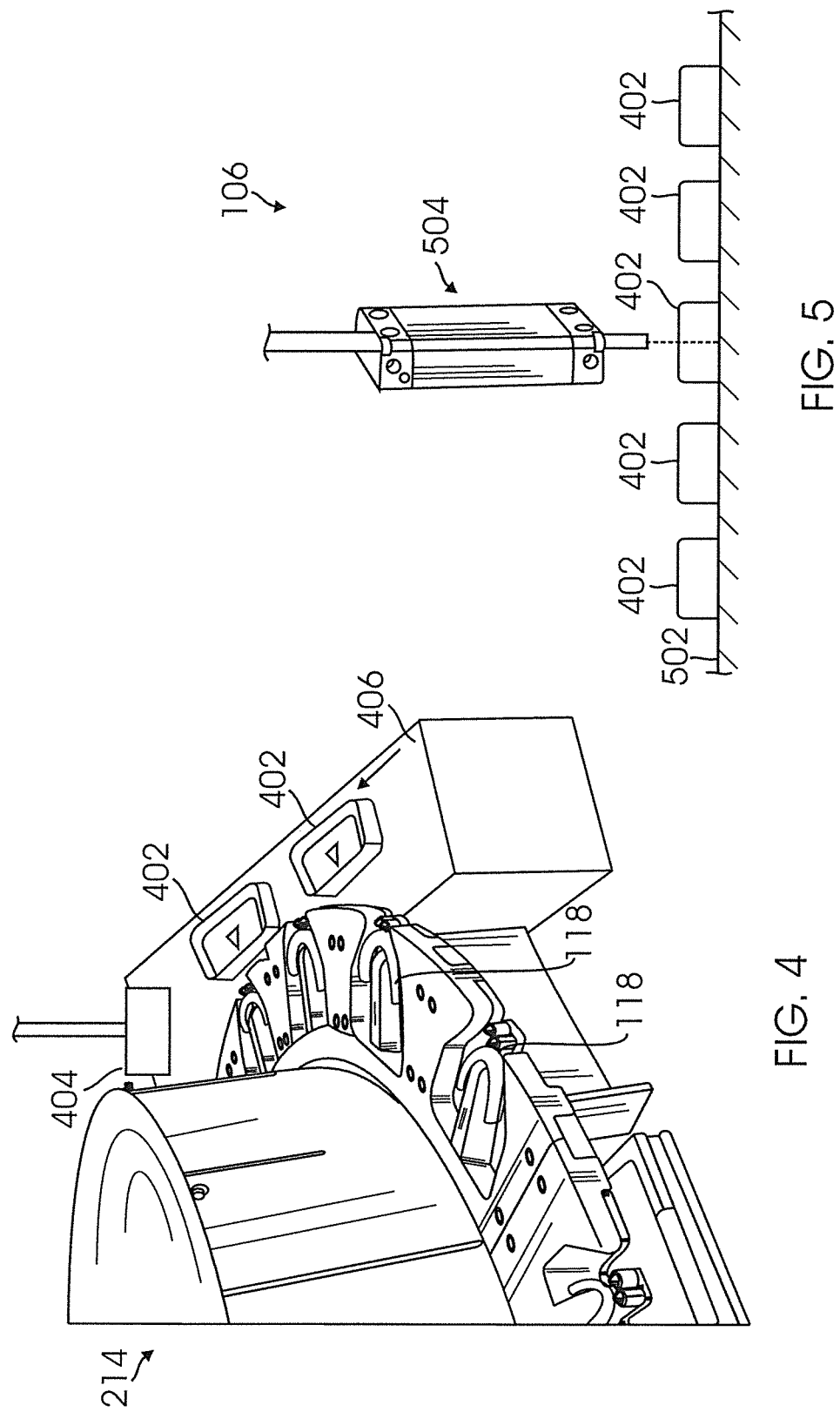

SYSTEM AND METHOD FOR SORTING ITEMS

CROSS REFERENCE TO RELATED APPLICATIONS

This application is a continuation application of U.S. application Ser. No. 16/155,519, filed on Oct. 9, 2018, now U.S. Pat. No. 10,766,055; which is a continuation application of U.S. application Ser. No. 14/874,083, filed on Oct. 2, 2015, now U.S. Pat. No. 10,099,256; which is a continuation application of U.S. application Ser. No. 13/775,692, filed on Feb. 25, 2013, now U.S. Pat. No. 9,152,145; which is a continuation application of U.S. application Ser. No. 13/209,222, filed on Aug. 12, 2011, now U.S. Pat. No. 8,383,977; which is a continuation application of U.S. application Ser. No. 11/553,330, filed on Oct. 26, 2006, now U.S. Pat. No. 8,030,588, the disclosure of which are incorporated herein in their entirety.

BACKGROUND

1. Field of the Invention

This invention relates to the sorting of objects, and more particularly to the sorting of mass produced, customized objects.

2. Description of the Related Art

Sorting devices are known for separately guiding finished parts to different discharge areas adjacent to tooling or packaging machines. Typically, sorting devices operate as a post-processing tool that is used to sort finished pieces.

Generally, finished pieces are identified on the basis of the quality of the material or the type of material. For example, only parts possessing a similar quality of material are selected and packaged together. The packaging station performs similar operations on similar parts. In most instances, parts having unique or customized features that must be packaged together are not readily accommodated. Presently, the sorting and packaging of unique, customized parts must be done manually to ensure accuracy.

Accordingly, there is a need to provide a simple and efficient sorting and selecting system that brings a variety of associated objects together during a production process with resulting improvements in efficiency and productivity.

SUMMARY

The present invention provides a system and associated method for sorting mass produced, customized objects.

In one aspect of the invention, a part sorting process is provided including loading a plurality of randomly presented parts; sorting at least one selected part of the randomly presented parts into a group of associated parts; and sequencing the group of associated parts.

In yet another aspect of the invention, a system is provided for sorting parts. The invention includes a system for receiving and continuously circulating a plurality of randomly presented parts. The invention also includes a sorting buffer for accumulating selected parts from the plurality of randomly presented parts in an assigned buffer location, and a sequencing system for sequencing the accumulated selected parts.

A more complete understanding of the invention can be obtained by reference to the following detailed description of the embodiments thereof in connection with the attached drawings.

BRIEF DESCRIPTION OF THE DRAWINGS

The above and other objects, features and advantages of the present invention will become more apparent from the following detailed description when taken in conjunction with the accompanying drawings in which:

FIG. 4 is a simplified illustration of an indexing table unloading parts and placing them on carriers in accordance with an embodiment of the present invention;

FIG. 5 is a simplified illustration of a reader in accordance with an embodiment of the present invention;

DETAILED DESCRIPTION

In the detailed description of the invention that follows, the invention is described primarily in the context of a system and method for sorting mass produced customized dental appliances, such as dental aligners. It should be understood, however, that the system and processes of the present invention may be employed in. the sorting of any of various types of items, work pieces or parts, such as prosthetic body parts, implantable hearing aids, eyeglass lenses and the like.

Figure 1A:
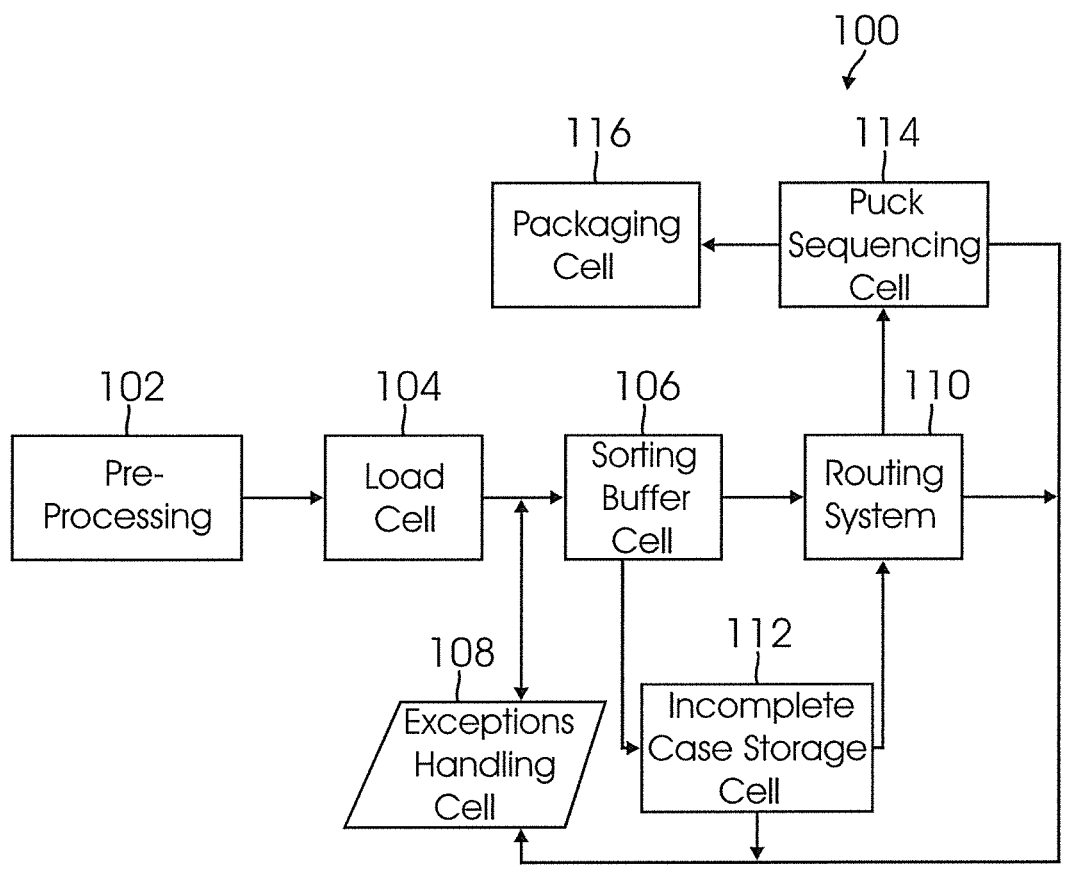
FIG. 1A is a flowchart of a sorting system process in accordance with an embodiment of the present invention.

FIG. 1A is a flowchart representing manufacturing cells of a sorting system 100 in accordance with an embodiment of the present invention. In pre-processing cell 102, if necessary, parts may undergo a pre-processing step in which the parts are cleaned, sanitized, or otherwise prepared for traversing sorting system 100.

Load cell 104 represents a process for the introduction of a batch or plurality of items or parts that are manually (or alternatively, automatically) loaded into sorting system. 100 via a bulk supply pre-feeder mechanism. The pre-feeder mechanism delivers parts to a part distribution and circulation system, which includes a system of conveyors that distribute the parts over a conveyor for presentation to a vision system. In one embodiment, the quantity of parts delivered may be a metered quantity of the entire batch of parts delivered periodically to the part distribution and circulation system to avoid overwhelming the system.

The vision system, including a robot picker, identifies the part location and orientation, then picks up and places each part onto an indexing table at a loading position. In one embodiment, the robot picker in conjunction with the vision system selects only parts having a desired top/bottom up orientation and places them on the indexing table. In yet another embodiment, the robot picker in conjunction with the vision system selects a part and manipulates the part, if necessary, until the part has the desired orientation before placing the part onto the indexing table. For example, the robot picker may pick a part having a bottom up orientation and then rotate the part until it has a top up orientation before placing the part onto the indexing table.

Alternatively, as described in greater detail below, the robot picker may place a part on the indexing table without regard to the part's orientation. The indexing table then indexes to a vision station so that the part can be scanned for top/bottom orientation. Once the part orientation is determined, the indexing table then indexes to a reorientation station, which includes a mechanism capable of rotating the part, as required, to achieve a desired top/bottom up orientation.

Once properly oriented, the indexing table indexes to a 'unique code' read station so that a unique code of each part can be read and ultimately mapped to a particular corresponding part carrier or "puck." After the indexing table indexes to an unload station, the properly oriented and identified parts are unloaded by a pick-and-place unit or the equivalent into the corresponding pucks.

In one embodiment, each puck may be identified by a radio frequency identification device (RFID). The puck's RFID and the unique code are "mapped" to each other and the data is stored in a database. Before exiting load cell 104, each puck is scanned by a subsequent vision system to verify "part presence."

The pucks are conveyed from load cell 1.04 to a sorting buffer cell 106. Alternatively, the pucks may be conveyed to an exceptions handling cell 108, which may include one or more manual quality assurance stations (QAS).

In one embodiment of sorting buffer cell 106, the pucks travel to a walking beam past an RF reader or the equivalent. The RF reader identifies the unique code number and temporarily assigns the unique code to one of a number of buffer lanes. If the number of parts to be included in one group requires more than one lane, the group may be logically split among buffer lanes to assure that the parts are sequenced correctly. The walking beam advances pucks in a controlled motion to the head of the sorting buffer lanes. Once a puck gets to its assigned lane, the puck is pushed out of the path of the walking beam and into its assigned lane. Pucks are accumulated in their assigned lanes until all parts in the batch are sorted. When a lane is filled with a completed group or case of associated parts, the group is released to the unload section of sorting buffer cell 106 when space is available. Buffer lanes are then released one at a time from the unload section of sorting buffer cell 106.

Routing system cell 110 includes a series of conveyors with merge and divert units routing pucks between the cells throughout sorting system 100. For example, the conveyors rout pucks from load cell 104 to sorting buffer cell 106 or exceptions handling cell 108 and back to load cell 104, from sorting buffer cell 106 to storage cell 112 and/or puck sequencing cell 114, and from puck sequencing cell 114 to packaging cell 116 or to exceptions handling cell 108 and back to load cell 104. Note that exceptions handling cell 108 may include more than one QAS, thus parts that are routed to exceptions handling cell 108 during various stages of the sorting process may be routed to the QAS associated with that particular stage.

Incomplete groups are routed from sorting buffer cell 106 to the incomplete case storage cell 112. In one embodiment, the pucks move via a conveyor, stop at an unloading station and are picked-and-placed on to a pallet. When the pallet is loaded it travels to an inserter/extractor (I/E) station. The pallet is transferred to the I/E via a standard lift and transfer. The I/E then moves the pallet to a shelf in a horizontal carousel for storage. When the last missing part or parts of a group arrives at incomplete case storage cell 112, the I/E picks the pallets with the associated parts and places the pallets onto the conveyor for transport to a loading station. At the loading station, the group is completed and is then moved to puck sequencing cell 114.

At puck sequencing cell 114, the pucks are transferred to a walking beam and moved past a series of lanes. The lanes of the conveyor are assigned, for example, 1 through 50 and when each puck is in front of the proper lane it is transferred onto a stop/start take away conveyor. Once all pucks are transferred they are released by the conveyor where they then travel in the proper sequence to packaging cell 116.

If a puck is marked "no read" at load cell 104 or sorting buffer cell 106, the puck is diverted to exceptions handling cell 108, which includes more than one QAS positioned throughout sorting system 100. In one embodiment, the manual QAS includes an RF reader provided to read an ID tag disposed on the puck. A quality assurance computer terminal is used to allow an operator to manually enter an ID number of the puck and thus re-initialize the puck into sorting system 100. The operator then releases the puck to be merged back into the main line ahead of sorting buffer cell 106. The manual QAS also introduces direct batches of products that do not enter sorting system 100 through load cell 104.

Figure 1B:
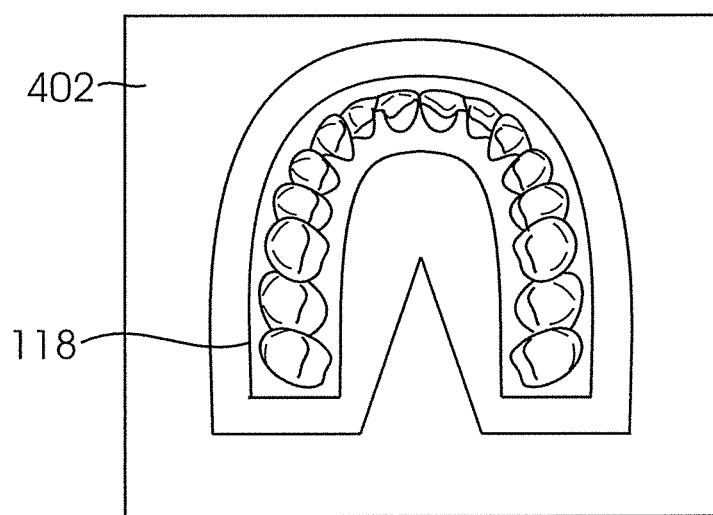
FIG. 1B is a simplified illustration of a dental aligner on a carrier in accordance with an embodiment of the present invention.

Generally, in one embodiment of the present invention, the mass produced, customized objects are dental appliances, referred to as a dental aligners, such as the dental aligner illustrated in FIG. 1B. Dental aligner 118 may be formed from a dental mold made from a computerized model representing digitally a patient's dental geometry and tooth configuration or, alternatively, from an impression made of a patient's teeth.

The computerized model of the patient's teeth may be digitally manipulated to portray a new tooth arrangement (i.e. an orthodontic prescription) and a mold may be produced to reflect each successive arrangement in the prescription. This may be repeated any number of times to derive a number of molds with differing tooth arrangements.

The series of computer models or digital data sets representing the dental geometries or orthodontic prescription associated with the series of molds is used to fabricate a series of dental aligners by disposing the dental molds in a thermoplastic fabrication machine. The series of dental aligners form a group of associated aligners that need to be sorted from other groups of associated aligners and properly sequenced before packaging.

In one exemplary embodiment, as shown in FIG. 1B, aligner 118 may be fabricated to fit within a 75 mm diameter, and have a weight less than. 8 ounces. Aligner 118 may be laser marked with patient information and aligner sequence with an upper or lower designation.

Dental aligner 118 may be of the type described, for example, in US Patent Application Publication No. 2005/0082703, which is incorporated herein by reference.

1. Load Cell

Figure 2:
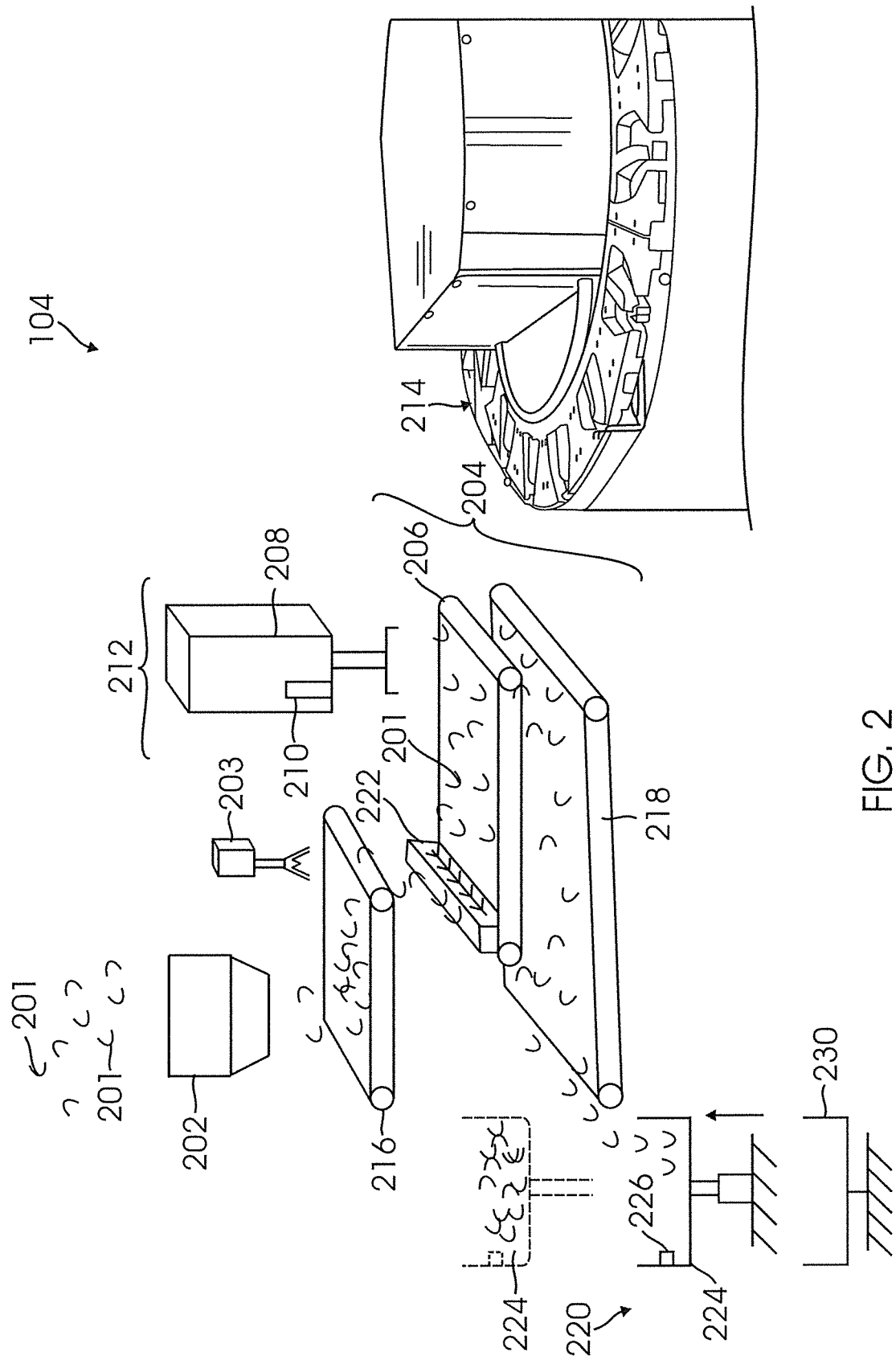
FIG. 2 is a simplified illustration of components of a load cell of a sorting system in accordance with an embodiment of the present invention.

FIG. 2 is a simplified illustration of load cell 104 of sorting system 100 in accordance with an embodiment of the present invention. In one embodiment, load cell 104 includes a bulk supply pre-feeder 202, a part circulation system 204, a robot loader 208, including or working in conjunction with a vision system 210, and an indexing table 214.

In one operational embodiment, a batch of parts 201, such as aligners 118 (FIG. 1B), are loaded into bulk supply pre-feeder 202. In one embodiment, as many as approximately 500 aligners 118 may be fed into bulk supply pre-feeder 202 in one operation. In one embodiment, aligners 118 arrive at bulk supply pre-feeder 202 after pre-processing or a pre-treatment for example, after having been cleaned, tumbled and disinfected.

In one embodiment, part circulation system 204 includes a metering conveyor 216, a vision belt conveyor 206, a return conveyor 218, and a return elevating bucket assembly 220. Bulk supply pre-feeder 202 may dispense a portion of the batch of aligners 118 in metered quantities onto metering conveyor 216 based on a signal from a level sensor 203 mounted proximate to or on metering conveyor 216. Level sensor 203 senses gaps between bunches of aligners 118 that have been dispensed on metering conveyor 216. For example, when the gaps become larger than a predetermined size, bulk supply pre-feeder 202 is made to dispense more aligners 118 into the system. As described below, aligners 118 that are disposed onto metering conveyor 216 from the return elevating bucket assembly 220 also create a portion of the bunches of aligners.

An exemplary bulk supply pre-feeder 202 may be a three and a half (3-V2) cubic foot pre-feeder, which is available as Farason Model GF-3.6, from Farason Corporation of Pennsylvania.

In one embodiment, to ensure that aligners 118 are distributed evenly onto vision belt conveyor 206 and are separated in a single layer, one or more rotating paddlewheels 222 with pliable spokes are mounted adjacent the end of metering conveyor 216 and the beginning of vision belt conveyor 206. The pliable spokes may be mounted on a horizontal axle or, alternatively, on one more vertical spindles. Paddlewheels 222, receive aligners 118, such that the pliable spokes separate aligners 118 to keep aligners 118 from grouping in large clumps onto vision belt conveyor 206. This increases the number of "pickable" parts dispersed onto vision belt conveyor 206.

Alternatively, parts 201 can be delivered directly from bulk supply pre-feeder 202 onto vision belt conveyor 206. In this alternative embodiment, bulk supply pre-feeder 202 may include a funnel shaped dispenser that allows parts 201 to be dispensed only along a single vertical plane, thus ensuring that the parts are dispersed in a separated manner.

Paddlewheels 222 distribute or spread aligners 118 over vision belt conveyor 206 for presentation to robot loader 208 in combination with a vision system 210 (hereinafter, in combination, "robot system 212"). As described below, aligners 118 are picked up from vision belt conveyor 206 and placed onto indexing table 214 by robot system 212. A suitable type of robot system 212 is available as an Adept Cobra 800 Scara Robot with Adept Vision.

Aligners 118 not removed by robot system 212 fall off vision belt conveyor 206 and return to metering conveyor 216 via the return conveyor 218 and return elevating bucket assembly 220 so that aligners 118 can be circulated and thus represented to robot system 212.

In operation, returning aligners 118 are discharged off the end of return conveyor 218 into return elevating bucket 224. The bucket cycles may be based on a level sensor 226 mounted in return elevating bucket 224, which indicates when enough parts (e.g. aligners) have been collected for return to metering conveyor 216. In one embodiment, return elevating bucket 224 elevates aligners 118 (as shown in phantom) and dispenses them onto metering conveyor 216, which may be mounted directly overhead and parallel to vision belt conveyor 206 and return conveyor 218. Metering conveyor 216 is cycled on and off to meter aligners 118 onto vision belt conveyor 206. In one embodiment, parts not unidentifiable by robot system 212 are rejected into a manual removal hopper 230 at the end of the operation for manual identification at a manual QAS.

Robot system 212 identifies the location and orientation of part 201 on vision belt conveyor 206, picks up and places each part 201 onto indexing table 214 at the loading position.

When no pickable parts are available to be processed from the current batch of aligners 118, the cycle for the batch is considered complete. The machine may automatically switch to "cleanout," which means bucket 224 remains in an. elevated location proximate to metering conveyor 116. Any remaining rogue parts 201 (i.e. aligners 118) then exit the back of the machine into manual removal hopper 230 for manual retrieval.

An exemplary type of part circulation system 204, including a metering conveyor, a vision conveyor, a return conveyor, and a return elevating bucket assembly, is available as Farason Model SRFF-30 FaraFeeder, from Farason Corporation of Pennsylvania.

Figure 3A:
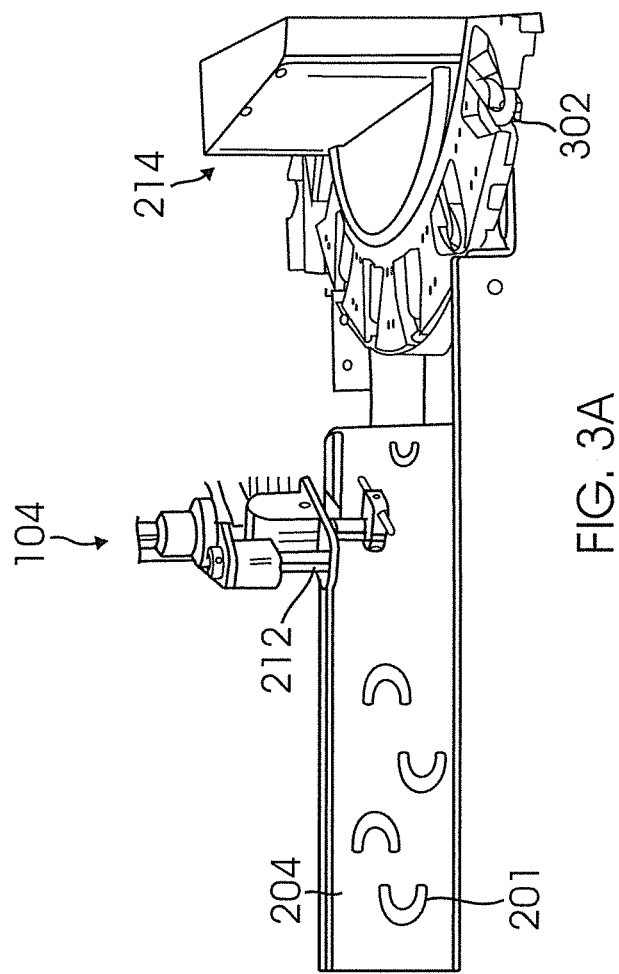
FIGS. 3A-3D are simplified illustrations of components of the load cell of FIG. 2 in accordance with an embodiment of the present invention.

As shown in FIG. 3A, indexing table 214 includes part holders 302, which are designed shaped and configured to receive and hold parts 201. In one embodiment, part holder 302 may be designed and shaped to hold and receive aligners 118.

Figure 3B:
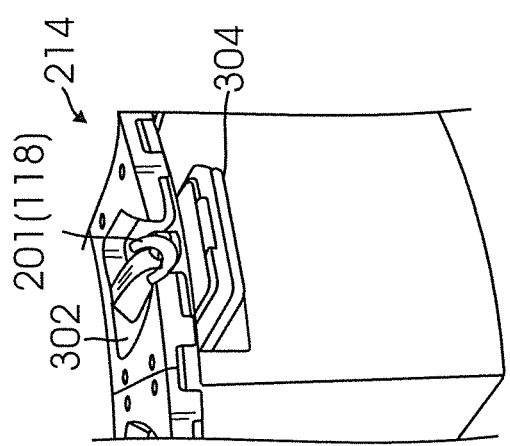

As shown in FIG. 3B, indexing table 214 may receive aligners 118 in any top-up or top-down orientation. Accordingly, to ensure that aligners 118 axe in an acceptable orientation, indexing table 214 indexes to a vision station 304 so that aligners 118 may be scanned for top-up or to down orientation. In operation, vision station 304 identifies the top-up or top-down orientation of aligner 118.

Figure 3C:
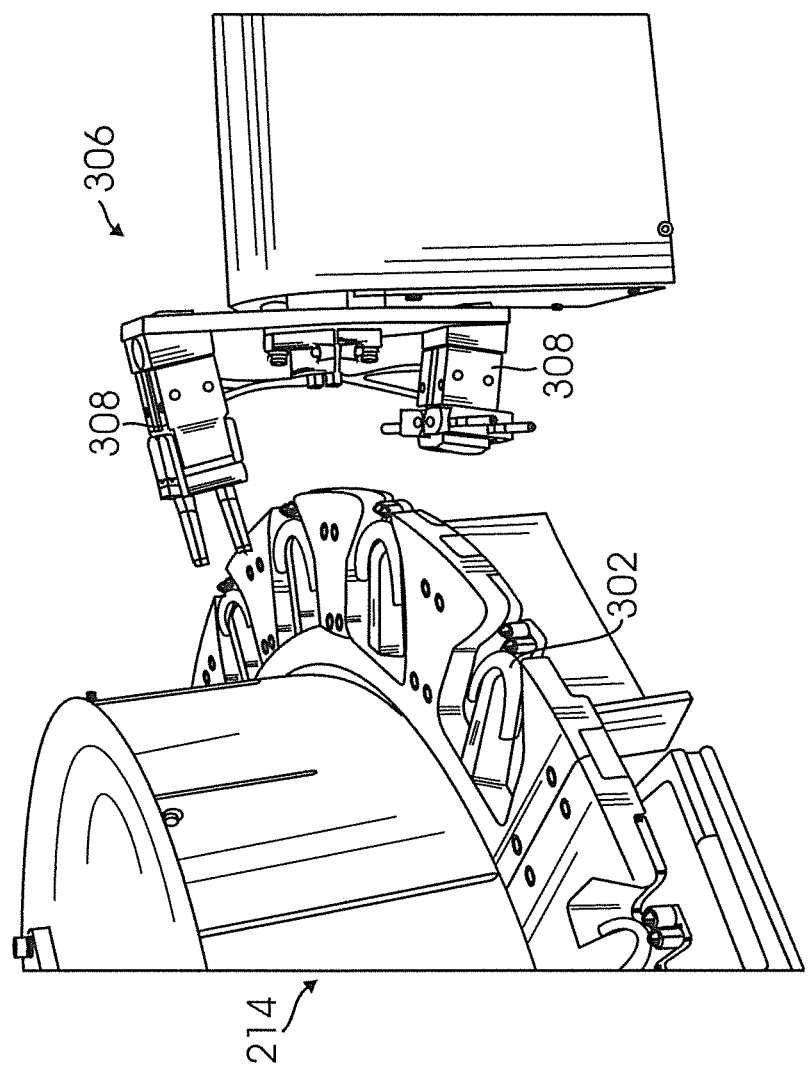

As shown in FIG. 3C, if it has been determined that aligner 118 is not in a desired orientation, when indexing table 214 indexes to reorientation station 306, at least one orienting device 308 is employed to manipulate aligner 118, as required, to achieve the desired orientation in holder 302. For example, orienting device 308 grips aligner 118 having the top-down, orientation and removes it from holder 302. Indexing table 214 continues to rotate the same holder 302 to the next incremental position. Simultaneously orienting device 308 rotates aligner 118 180° to achieve a top-up orientation. Orienting device 308 then replaces aligner 118 back into its same holder 302.

Figure 3D:
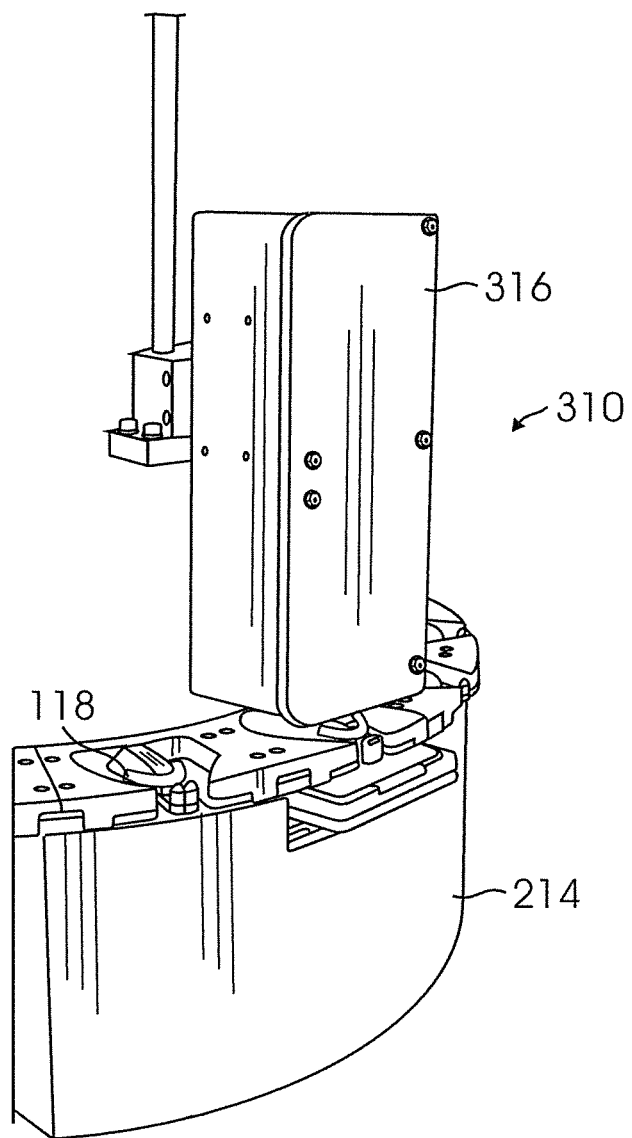

As shown in FIG. 3D, indexing table 214 then indexes to a 'code' read station 310. Code read station 310 includes a vision system 316 including a processor or computer. Vision system 316 reads an identification mark preformed on aligner 118, such as a laser code. The computer is used to access the vision system software for initial setup of the code read or for re-programming.

In operation, vision system 316 identifies aligner 118 and maps the aligner to a carrier 402, (hereinafter puck 402, see FIGS. 1B and 4) used to ferry aligner 118 through the remaining sorting process. In one embodiment, each puck 402 is identified using an ID system, such as that which uses a small RFID for identification and tracking purposes. An RFID tagging system includes the tag, a read/write device, and a host system application, for data collection, processing, and transmission. An RFID tag may include a chip, memory and an antenna.

As shown in FIG. 4, after an aligner 118 has been identified and mapped to puck 402 at code read station 310 (FIG. 3D), indexing table 214 moves to an 'unload' station where pick and place unit 404, for example, a robot arm with a vacuum end arm tool, unloads aligner 118, and places aligner 118 into puck 402, which is being conveyed on conveyor 406. Pick and. place unit 404 may be designed to unload any volume of parts, for example, two at a time.

"No reads" from vision system 316 may occur from time to time due to an illegible code on part 201. If this occurs, vision system 316 sends a "no read" signal to a manual quality control station. The RFID tag on puck 402 to be mapped to the unidentified part 201 is marked with a "no read" bit and routed to the manual quality control station for identification.

2. Sorting Buffer Cell

As previously described, pucks 402 including parts 201 are conveyed from load cell 104 to sorting buffer cell 106 or, in the case of the 'no reads', to exceptions handling cell 108. Sorting buffer cell 106 is used to group parts 201 into predetermined groups. Thus, the randomly loaded parts 201 that enter load cell 104 are placed into predetermined groups as desired.

Figure 6A:
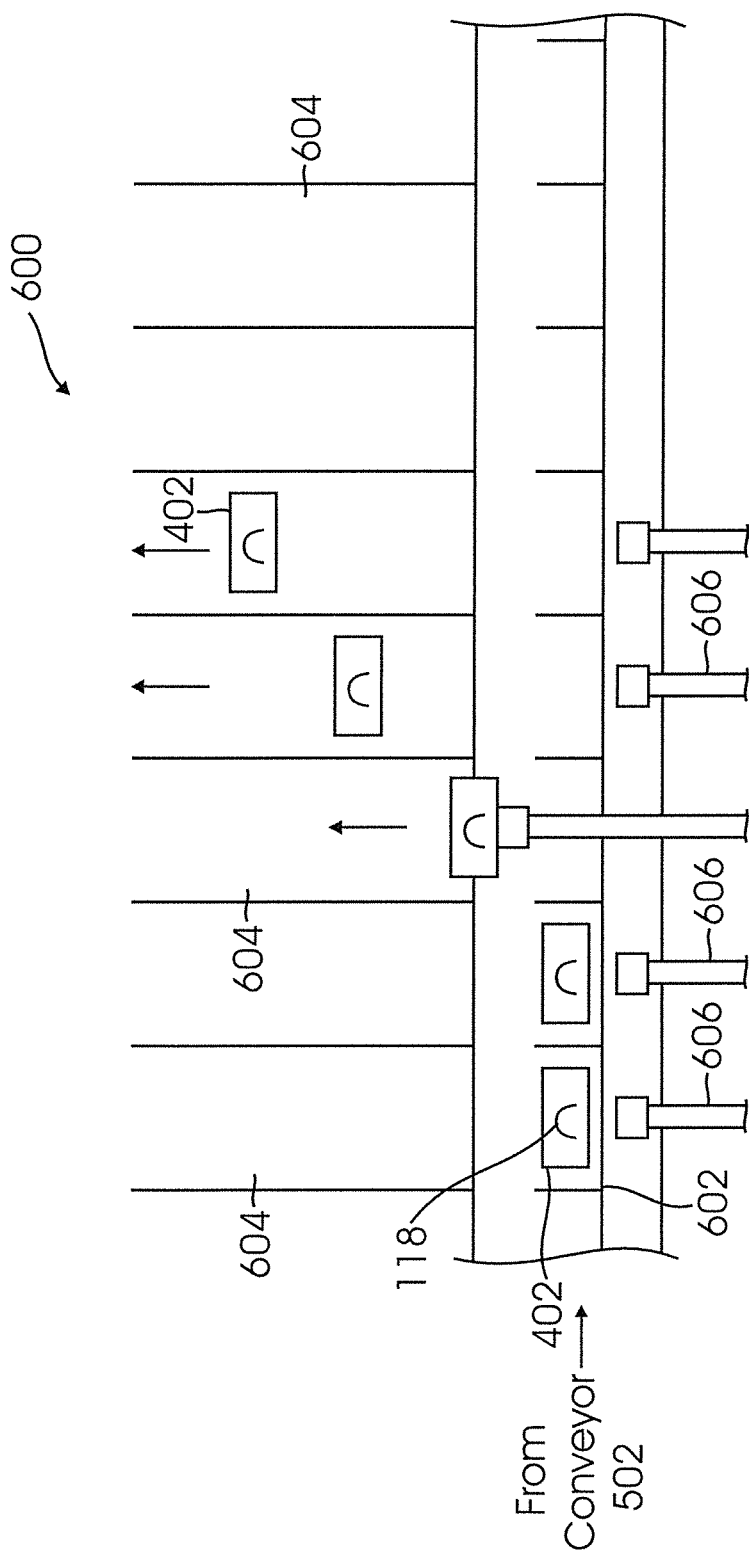
FIG. 6A is a simplified illustration of components of a sorting buffer cell in accordance with an embodiment of the present invention.

In one embodiment, as shown in FIGS. 5 and 6A, sorting buffer cell 106 includes a conveyor 502, a reader 504, such as an RF reader or the equivalent, and a walking beam 600. In operation, pucks 402 travel on conveyor 502 past reader 504 to walking beam 600. Reader 504 identifies puck 402, which includes the unique part 201, as part of a specific grouping of parts 201. For example, in one embodiment, part 201 is aligner 118 having a unique shape and size. Aligner 118 may be one of a group of aligners representing a full prescription of aligners 118 for use with a single patient. Thus, as reader 504 identifies pucks 402 including aligners 118 as belonging to the predetermined prescription, processing capabilities associated with reader 504 cause pucks 402 to be temporarily assigned to one of a number of buffer lanes 604 (FIG. 6A) designated for aligners 118 for the predetermined prescription. Thus, assignment of buffer lanes 604 corresponds with the desired grouping. Thus, each new "case", "group" or "prescription" to enter walking beam 600 has a new buffer lane 604 assigned. Buffer lanes 604 are assigned to cases in a logical order. If the size of the grouping requires more than one buffer lane 604, the order is logically split among buffer lanes 604. For example, if a case exceeds 50 aligners 118, the case is assigned two buffer lanes 604 and pucks 402 are separated according to case or prescription number.

As shown in FIG. 6A, in operation, walking beam 600, includes a buffer conveyor 602, buffer lanes 604 and pushers 606. In operation, after reader 504 (FIG. 5) reads the ID, such as the RFID tag on puck 402, puck 402 is conveyed to buffer conveyor 602. In one embodiment, buffer conveyor 602 may be equipped with a motor and encoders (not shown.) so that each revolution of the motor equals one puck move or step.

Figure 6B:
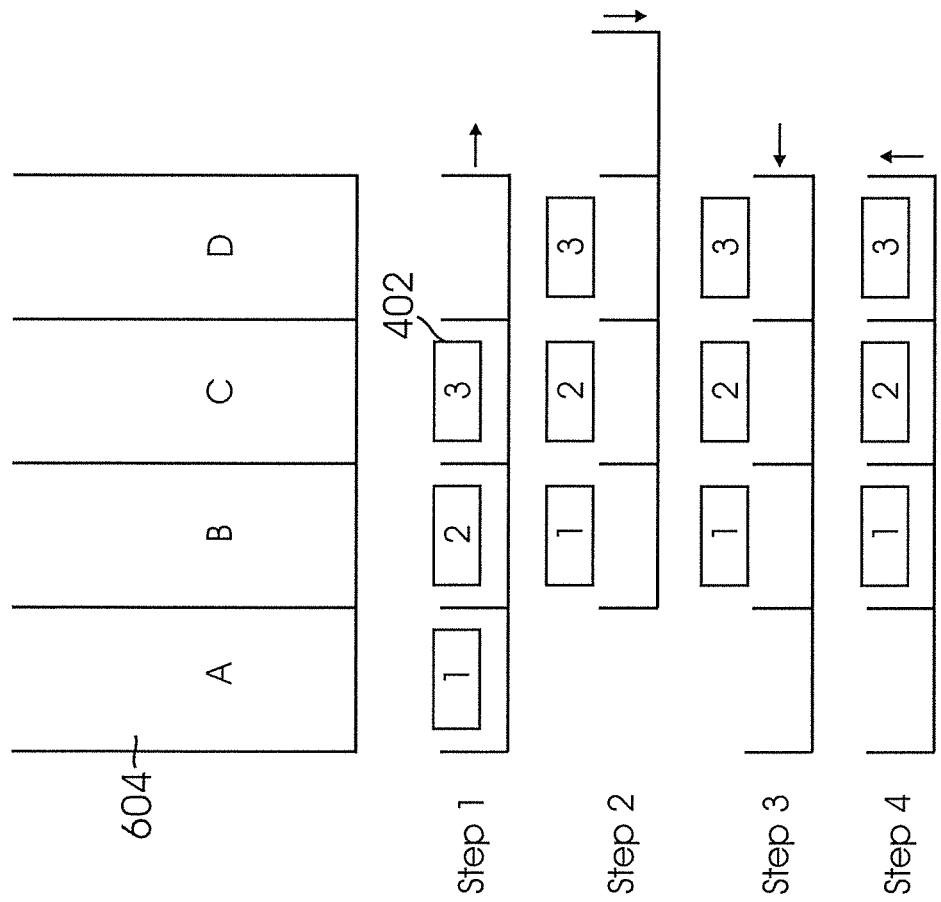
FIG. 6B is a simplified Illustration of the operation of a buffer conveyor associated with the sorting buffer cell in FIG. 6A in accordance with an embodiment of the present invention.

In operation, as shown, in FIG. 6B, to advance pucks (1, 2, 3) from in front of corresponding buffer lanes (A, B, C) to in front of corresponding buffer lanes (B, C, D), buffer conveyor 602 moves one increment to the right casing pucks (1, 2, 3) to move one position. Buffer conveyor 602 then moves back away from pucks (1, 2, 3) and then to the left. Once back in its original position, buffer conveyor 602 moves forward to once again surround pucks (1, 2, 3). Pucks 402 are advanced in this controlled stepping motion so that each puck 402 may be paused at the head of each new buffer lane 604 before being moved to the head of the next buffer lane 604.

Once puck 402 has reached the head of its assigned buffer lane 604, puck 402 is pushed, while paused, out of the path of buffer conveyor 602. Puck 402 is pushed using pushers 606 into sorting buffer lanes 604. In one embodiment, pushers 606 may be pneumatically or hydraulically activated pistons. Alternatively, pucks 402 may be pushed into buffer lanes 604 using a robotic picker or a burst of air and the like.

Accordingly, pucks 402 accumulate in their assigned buffer lanes 604 until all aligners 118 entering load cell 104 are sorted into their associated groups. In one embodiment, when a buffer lane 604 is filled with a completed group, such as a full prescription of aligners 118, the group may be released to the unload section of sorting buffer cell 106. In one embodiment, buffer lanes 604 may be about 35 feet long and 4 feet wide and may have a belt speed for moving pucks 402 down the lane of about 60 ft/minute. Buffer lanes 604 also may include a series of release gates (not shown) for allowing the removal of a group of pucks 402. Buffer lanes 604 are released one at a time from the unload section of sorting buffer cell 106 to puck sequencing cell 114.

In one embodiment, the gross production rate for sorting buffer cell 106 may be about 60 parts per minute. In addition, sorting buffer cell 106 may include up to 30 buffer lanes 604, which may hold up to 50 pucks 402, yielding an overall capacity of 3000 pucks 402. In addition, sorting buffer cell 106 may also have a downstream capacity equal to that of the upstream capacity.

In the event that reader 504 (FIG. 5) is unable to read an RFID tag, the unidentified puck 402 may be routed to the manual quality control station where an operator may need to manually re-enter the unidentified puck into the system. If the operator manually re-enters the unidentified puck into the system before the batch has completed its cycle, the puck is sent to the proper buffer lane 604. Subsequently, the completed group of pucks is directed to puck sequencing cell 114.

3. Puck Sequencing Cell

Figure 7:
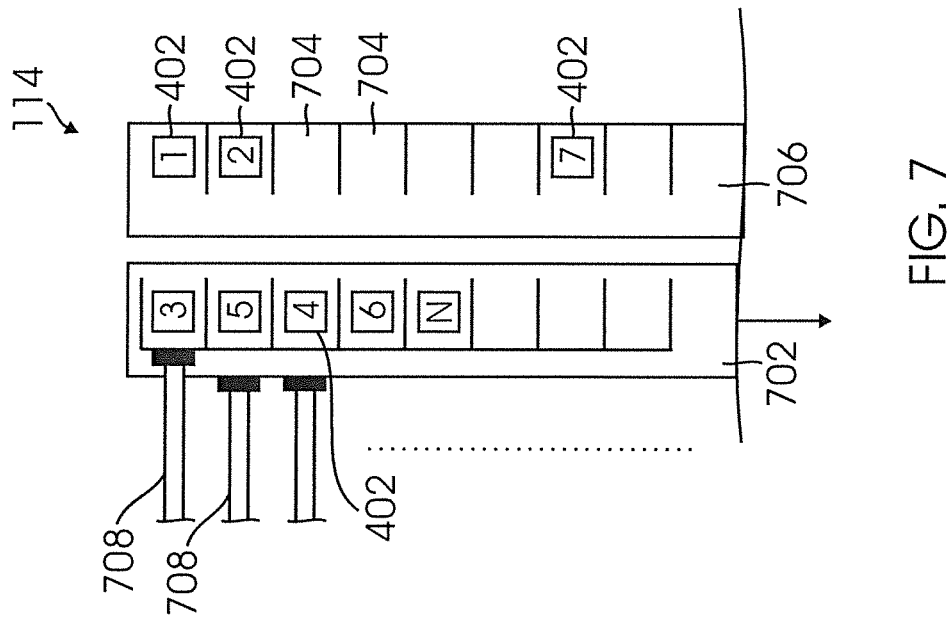
FIG. 7 is a simplified illustration of components of a puck sequencing cell in accordance with an embodiment of the present invention.

After aligners 118 are grouped into buffer lanes 604, they are next placed in a predetermined sequence. As illustrated in FIG. 7, puck sequencing cell 114 includes sequencing walking beam 702 and stop/start take away conveyor 706, which may be running at 60 ft/min. Prior to entering puck sequencing cell 114, pucks 402 index past an RFID reader similar to that shown in FIG. 5. The reader reads the RFID tag associated with puck 402 and places the value in a moving register. Pucks 402 are then indexed to the corresponding sequencing lane 704. Sequencing walking beam 702 may be equipped with a motor and an encoder (not shown) so that each revolution of the motor equals one puck move followed by a pause in the same manner as described above with regard to FIGS. 6A and 6B. Each time the pucks 402 move, the RFID number is moved accordingly in the register.

Once puck 402 has reached its assigned position, puck 402 is pushed using pushers 708 during the pause out of the path of sequencing walking beam 702 and onto start/stop take away conveyor 706 into an assigned lane 704. This process repeats until the maximum number of parts is in their correct positions in lanes 704. Once it has been verified that all pucks 402 have made it to the proper positions, puck sequencing cell 114 releases the group of parts 201 to packaging cell 116.

In one example, aligners 118 in pucks 402 are to be placed in a sequence numbered 1-N for clarity. Pucks 402 are conveyed and transferred to sequencing walking beam 702 and moved past sequencing lanes 704. Sequencing lanes 704 of stop/start take away conveyor 706 are assigned 1 through N lanes 704, for example, 1-50. As puck 402 is positioned by sequencing walking beam 702 in front of the proper sequencing lane 704, puck 402 with aligner 118 is transferred onto the stop/start take away conveyor 706. Once all pucks 402 are transferred, which means that aligners 118 for a particular prescription are positioned in the desired number sequence, pucks 402 are released by conveyor 706 and are moved in the desired sequence to packaging cell 116 for further processing. Sequencing walking beam 702 and transfer designs may be identical to those used in walking beam 600 of sorting buffer cell 106.

In one embodiment, puck sequencing cell 114 may operate at a rate of 45 PPM and may be able to buffer a maximum of 50 aligners 118.

Referring again to FIGS. 5 and 6A, it may happen that a puck 402 holding aligner 118 is not identified by reader 504 (FIG. 5) and may need to be re-circulated. Meanwhile, the group of identified pucks 402 continues to be held in a particular buffer lane 604 until all associated aligners 118 of a particular group are gathered in the designated buffer lanes 604. In one embodiment, after a default time has been reached, the incomplete group of identified pucks 402 may be diverted to an incomplete case storage cell 112.

4. Incomplete Case Storage Cell

Figure 8:
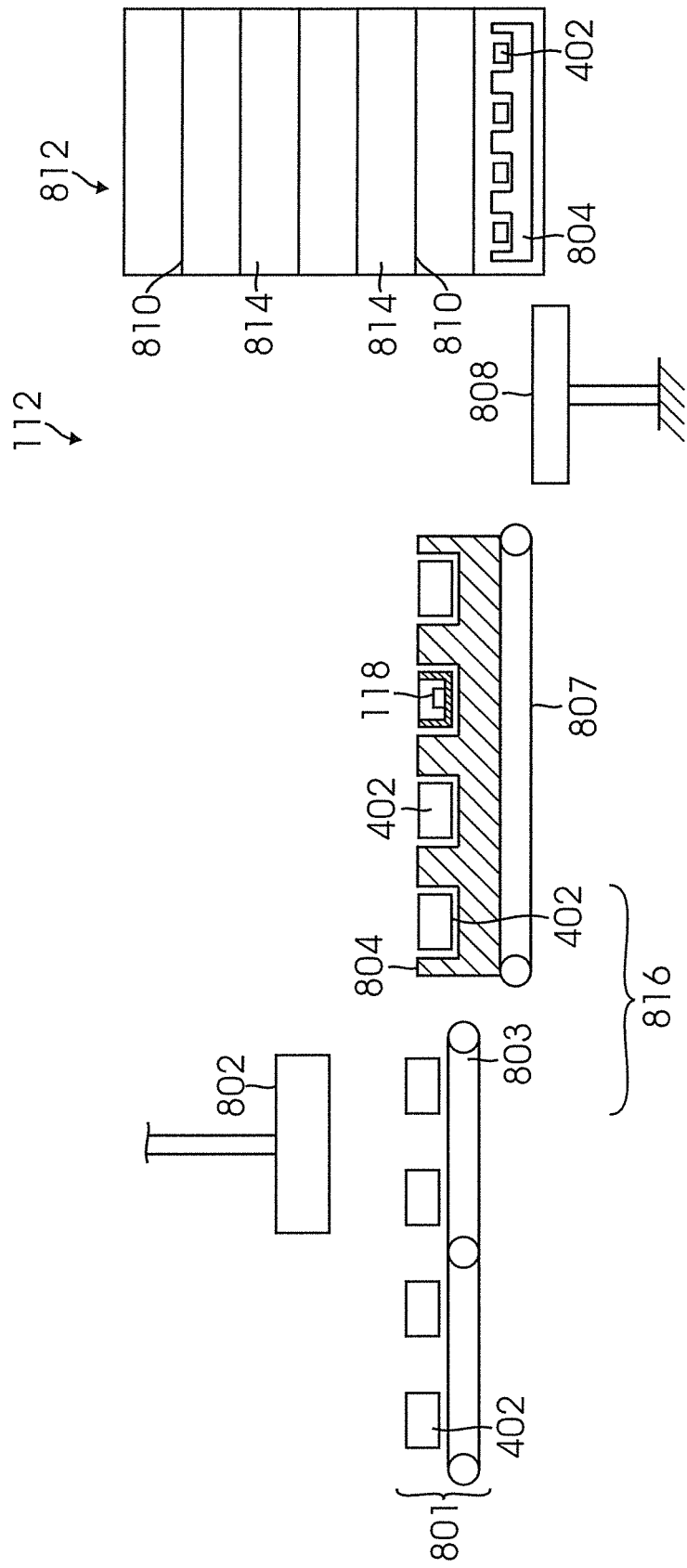
FIG. 8 is a simplified illustration of a storage cell in accordance with an embodiment of the present invention.
Figure 9:
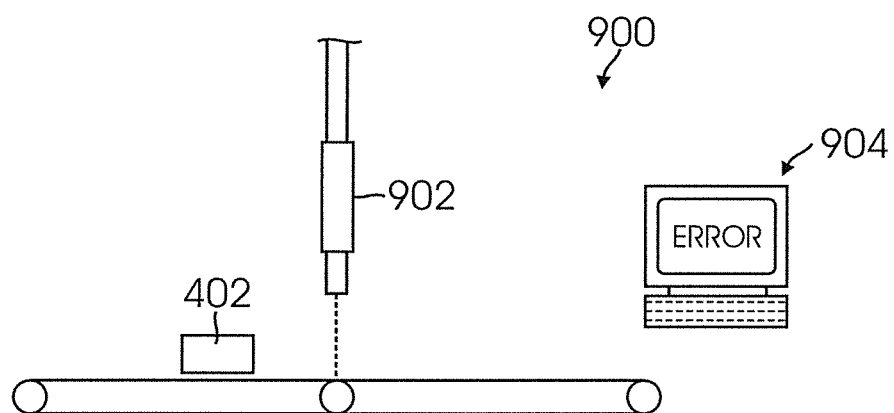
FIG. 9 is a simplified illustration of a quality control station in accordance with an embodiment of the present invention.

Incomplete groups or cases 801 of parts 201 are routed from sorting buffer cell 106 to incomplete case storage cell 112 (hereinafter "storage cell 112"). As shown in FIG. 8, pucks 402 move via a conveyor 803, to an unloading station 816 and are picked-and-placed via a pick-and-place mechanism 802 to a pallet 804. When pallet 804 is loaded it travels to a standard Inserter/Extractor (I/E) unit 808. In one embodiment, I/E unit 808 causes pallet 804 to move to a shelf 810 in a horizontal carousel 812 for storage. When the last missing aligners 118 of an associated group 801 makes it to storage cell 112, I/E unit 808 picks pallet 804 with the associated aligners 118 and places pallets 804 onto a conveyor for transport to a loading station. At the loading station, the group is completed. The group of pucks 402, now completed, is moved to puck sequencing cell 114.

In one operational embodiment, incomplete cases 801, which are identified at sorting buffer cell 106, are routed to storage cell 112 via conveyor system 803. Pucks 402, including aligners 118, stop at a loading/unloading station 816 where a maximum of four pucks 402 are picked and placed using pick-and-place mechanism 802 onto pallet 804. In this embodiment, a maximum of 16 pucks 402 are held on a 4x4 pallet 804 with a maximum of 4 different cases or groups 801 stored on each pallet 804.

Pallet 804 moves via a conveyor 807 to I/E unit 808. I/E unit 808 vertically moves pallet 804 to access particular shelves 810 located within carousel bins 814 in horizontal carousel 812 for storage.

When the last missing aligner 118 of a particular case 801 moves to storage cell 112, the system reverses the storage process and removes the proper pucks 402 (i.e. pallets) for the particular case 801. Pallets 804 housing the remaining aligners 118 are removed from horizontal carousel 812 using I/E unit 808 and are placed back on conveyor 807. Pallets 804 are then transported to the loading/unloading location 816. Pucks 402 are picked and placed back onto main conveyor 803 and held until all aligners 118 for that case 801 are once again present. After all pucks 402 are in position and ease 801 is full, case 801 is released to puck sequencing cell 114.

In one operational embodiment, storage cell 112 may operate at a rate of 4 pallets per minute or up to 64 pucks per minute if all 16 places on each pallet are full.

Storage cell 112 handles incomplete cases 801 and stores them until such time that it has been verified that all parts 201 have arrived. In one embodiment, cases 801 may be resolved within 24 hours. In one embodiment, a query may be made for a list of aligners 118 stored in storage cell 112, which may be sorted by "time in".

In one embodiment, it may be possible to get a "no pick" from the pick and place mechanism 802 either from conveyor 803 to pallet 804 or from pallet 804 to the conveyor. If this occurs, pick-and-place mechanism 802, after placing pucks 402 it has already picked, goes back to the "no pick" position and re-picks the missing puck 402.

5. Exceptions Handling Cell

If a puck 402 is marked "no read" at load cell 104 or sorting buffer cell 106, the non-read puck 402 is diverted to exceptions handling cell 108, which includes one or more manual quality control stations 900. Manual quality control station 900 may include an RF reader 902 provided to read the RFID tag on puck 402. Manual quality control station 900 may also include a computer terminal 904 that allows an operator to manually enter the code number of puck 402 and aligner 118 and thus initialize it in the system. The operator may release the puck 402 and so it may be merged back into the main line ahead of sorting buffer cell 106. If the operator can enter the information before the current batch of aligners 118 has been transferred to the discharge end of sorting buffer cell 106 then it can be sent to the proper buffer lane 604 (FIG. 6A) just as if puck 402 had come from load cell 104. If, however, the operator cannot enter aligner 118 in time, puck 402 is sent through sorting buffer cell 106 to storage cell 112. Alternatively, manual quality control station 900 can also introduce direct batches of parts that do not enter the sorting system through load cell 104.

In accordance with the present invention, each cell of the present invention includes routing capabilities that are well known in the art. Routing system 110 includes, for example, a series of conveyors with merge and divert units routing pucks 402 throughout sorting system 100. Conveyors and conveying techniques are used to rout pucks 402 from the load cell to the sorting buffer cell or to the manual quality control station and back to the load cell, from the sorting buffer cell to the incomplete case storage cell and/or the puck sequencing cells, and from the puck sequencing cells to the packaging cell or to the manual quality control station and back to the load cell.

In one operational embodiment, routing of pucks 402 is done using a plurality of multiple conveyors and part conveying techniques, with merge and divert units. In one example, with no intention to limit the invention, a first conveyor routs pucks from load cell 104 to sorting buffer cell 106 or exceptions handling cell 108 and back to load cell 104. The first conveyor includes merge and divert units to allow "no read" pucks to go to the manual quality control station. A second conveyor routs pucks 402 from sorting buffer cell 106 to incomplete case storage cell 112 and/or puck sequencing cell 114. The second conveyor includes a plurality of merge and divert units. A first divert unit allows a puck 402 to go to one of two puck sequencing cells and a second divert unit allows pucks 402 to go to incomplete case storage cell 112. A third conveyor routes pucks 402 from puck sequencing cell 114 to packaging cell 116 or to exceptions handling cell 108 and back to load cell 104. A third conveyor may include two merge units and one divert unit. The divert unit allows pucks 402 to go to either the load cell 104 or a second manual quality control station. The conveyors may ran at any appropriate speed, for example, at a speed of 60 feet per minute allowing for a puck throughput rate of at least 60 parts per minute on each conveyor. Conveyors and conveying techniques are well known and are available from, for example, FlexLink Systems, Inc. of Allentown, Pa.

While the present invention has been shown and described with reference to specific embodiments thereof, it will be understood by those skilled in the art that various changes in form and details may be made therein without departing from the spirit and scope of the invention.

What is claimed is:

1. A sorting and sequencing system for mass-produced, customized objects, each of the objects being marked with a unique machine-readable code that includes, for each of the objects, group data and sequence data indicating a sequence position within a group, the system comprising:
   a plurality of object carriers, each having a unique identity that associates each of the plurality of object carriers with one of the objects;
   a code-reading mechanism operable to (a) determine if the code on each of the objects is readable or unreadable, (b) read the code on each of the objects having a readable code, and (c) associate each of the objects on which the code is read with the group data and the sequence data for that object;
   a computer operatively coupled to the code-reading mechanism and configured by a computer-implementable program to (a) map the code of each of the objects on which the code has been read by the code-reading mechanism to the identity of an associated one of the plurality of object carriers, and (b) map each of the objects with the unreadable code to an object carrier;
   a placement mechanism operatively associated with the computer and operable to (a) place each of the objects having a readable code on its associated object carrier using the code of each object and the identity of its associated object carrier, and (b) place each of the objects with an unreadable code on the object carrier to which each of the objects with an unreadable code has been mapped; and
   a quality control station operable to receive each of the object carriers on which the placement mechanism has placed one of the objects with the unreadable code.

2. The sorting and sequencing system of claim 1, further comprising:
   a sorting mechanism responsive to the code-reading mechanism and operable to direct each of the objects having a readable code into an assigned one of a plurality of buffer locations based on the group data of the object, thereby sorting the objects into a plurality of groups, each group of objects having a readable code being held in an assigned buffer location; and
   a sequencing mechanism responsive to the code-reading mechanism and operable to receive each group of objects having a readable code from its assigned buffer location and to place each of the objects having a readable code in each of the groups into a sequence based only on the sequence data of the objects;
   wherein the sorting mechanism is operable, in response to the group data, to identify a group of objects in a buffer location as an incomplete group, the system further comprising a storing mechanism configured to receive the incomplete group of objects from the buffer location with the incomplete group of objects, to store the incomplete group of objects until a complete group is formed by further objects received from the buffer locations, and to send the complete group to the sequencing mechanism.

3. The sorting and sequencing system of claim 2, wherein the quality control station is operable to determine the code of each of the object carriers received by the quality control station and to provide the determined code to the sorting mechanism.

4. The sorting and sequencing system of claim 3, wherein the identity of each of the object carriers is provided by an RFID device, and wherein the quality control station includes an RFID reader operable to read the RFID device to obtain the identity of each of the object carriers.

5. The sorting and sequencing system of claim 2, wherein:
   the sorting mechanism is operable to direct each of the object carriers carrying an object into one of the plurality of buffer locations based on the group data of the object carried thereon, thereby sorting the object carriers into the plurality of groups, each group of object carriers being held in an assigned buffer location; and
   the sequencing mechanism is operable to receive each group of object carriers from its assigned buffer location and to place each of the object carriers in each of the groups into a sequence based on the sequence data of the object carried thereon.

6. The sorting and sequencing system of claim 5, further comprising a storing mechanism configured to receive an incomplete group of object carriers from the sorting mechanism, to store the incomplete group of object carriers until a complete group is formed by further object carriers received from the sorting mechanism, and to send the complete group to the sequencing mechanism.

7. The sorting and sequencing system of claim 6, wherein the storing mechanism comprises:
   a loading mechanism operable to load the incomplete group of object carriers received from the sorting mechanism onto a pallet; and
   a routing mechanism operable to route the pallet to a storage location.

8. The sorting and sequencing system of claim 2:
   wherein the code-reading mechanism is operable to associate each of the objects with an associated object carrier based on the group data and the sequence data;
   wherein the sorting mechanism is operable to determine the unique identity of each of the object carriers and to direct each of the object carriers holding its associated object into one of the plurality of buffer locations based on an association of the unique identity of each of the object carriers with the group data of the object carried thereon; and
   wherein the sequencing mechanism is operable to determine the unique identity of each of the object carriers and to place the object carriers in each of the carrier groups into a sequence based on an association of each of the object carriers in each of the carrier groups with the sequence data of the object carried thereon.

9. The sorting and sequencing system of claim 8, wherein the sorting mechanism comprises:
   a sorting reader operable to determine the unique identify of each of the object carriers and to assign each of the object carriers to one of the buffer locations based on the association of the unique identity of each of the object carriers with the group data of the object carried thereon; and a carrier grouping mechanism operable to move each of the object carriers to its assigned buffer location.

10. The sorting and sequencing system of claim 9, wherein the carrier grouping mechanism comprises:

a buffer location selection device operable to place each of the object carriers into one of the buffer locations selected in accordance with the assignment provided by the sorting reader, whereby each of the buffer locations contains a single carrier group.

11. The sorting and sequencing system of claim 8, wherein the sequencing mechanism comprises:

a sequencing reader operable to determine the unique identify of each of the object carriers in each of the carrier groups and to assign each of the object carriers in each of the carrier groups to a sequencing location based on the association of the unique identity of each of the object carriers in each of the carrier groups with the sequence data of the object carried thereon; and a carrier sequencing device operable to move each of the object carriers to its assigned sequencing location until the object carriers in each of the carrier groups are positioned in a predetermined sequence in accordance with the sequencing data of the objects carried thereon.

12. The sorting and sequencing system of claim 8, further comprising:

a conveyor operable to receive a plurality of randomly-presented objects; and a vision system operable to identify the objects by their location on the conveyor;

wherein the placement mechanism is operable to pick the objects identified by the vision system from the conveyor and to place each of the identified objects onto the one specific object carrier with which it has been associated.

13. The sorting and sequencing system of claim 12, wherein the vision system is further operable to identify the objects on the conveyor by their orientation, and wherein the placement system is operable to pick only objects from the conveyor that are identified by the vision system as having an orientation that conforms to a desired orientation.

14. The sorting and sequencing system of claim 12, wherein the vision system is further operable to determine whether the objects on the conveyor have an orientation that conforms to a desired orientation, and wherein the placement system is operable to manipulate into the desired orientation objects determined not to be in the desired orientation before placing the objects onto the object carriers.

15. The sorting and sequencing system of claim 1, further comprising:

an indexing table operable to receive a plurality of randomly-presented objects; and an orientation mechanism operable to orient each of the objects on the indexing table into a desired orientation;

wherein the placement mechanism is operable to receive the oriented objects from the indexing table and to place each of the oriented objects on its associated object carrier.

16. The sorting and sequencing system of claim 15, wherein the orientation mechanism comprises:

a vision station operable to determine whether the objects on the indexing table are in the desired orientation; and an orienting device responsive to the vision station and operable to manipulate into the desired orientation objects that are determined not to be in the desired orientation.

17. The sorting and sequencing system of claim 16, wherein the indexing table includes a plurality of object holders, and wherein the orienting device is operable to (a) remove from an object holder of the indexing table an object that is determined not to be in the desired orientation, (b) manipulate the removed object into the desired orientation, and (c) replace the manipulated object into the same object holder from which it was removed.

18. The sorting and sequencing system of claim 15, further comprising:

a bulk supply feeder operable to dispense a batch of the objects;

a conveyor system operable to receive a metered quantity of the objects from the bulk supply feeder;

a sensor operable to sense spacing gaps between the objects on the conveyor system and to cause the bulk supply feeder to dispense additional objects onto the conveyor system in response to the spacing gaps exceeding a predetermined size; and a pick-and-place mechanism operable to remove the objects from the conveyor system and to place them on the indexing table.

19. The sorting and sequencing system of claim 18, further comprising:

an object distribution device operable to distribute the objects into a single layer on the conveyor system.

20. The sorting and sequencing system of claim 19, wherein the object distribution device comprises a dispenser on the bulk supply feeder that is operable to dispense the objects on the conveyor system in a single layer.

21. The sorting and sequencing system of claim 18, wherein the pick-and-place mechanism is operable to take less than all of the objects from the conveyor system, and wherein the sorting and sequencing system further comprises:

a return conveyor operable to receive the objects from the conveyor system that are not removed by the pick-and-place mechanism; and a return bucket assembly operable to receive the objects from the return conveyor and to transport the objects back to the conveyor system so as to be removable therefrom by the pick-and-place mechanism.

22. The sorting and sequencing system of claim 1, further comprising:

a conveyor operable to receive a plurality of randomly-presented objects;

an indexing table having a plurality of object holders, each of the holders being configured to receive one of the objects;

a vision system operable to identify the objects by their location on the conveyor; and a robot picker operable to pick objects identified by the vision system from the conveyor and to place each of the objects into one of the object holders;

wherein the placement mechanism is operable to unload the objects from the object holders and to place each of the objects on its associated object carrier.

23. The sorting and sequencing system of claim 22, wherein the vision system is further operable to identify the objects on the conveyor by their orientation, and wherein the robot picker is operable to pick only objects from the conveyor that are identified by the vision system as having an orientation that conforms to a desired orientation.

24. The sorting and sequencing system of claim 22, wherein the vision system is further operable to determine whether the objects on the conveyor have an orientation that conforms to a desired orientation, and wherein the robot picker is operable to manipulate into the desired orientation objects determined not to be in the desired orientation before placing the objects onto the object holders.

25. The sorting and sequencing system of claim 2, wherein the storing mechanism comprises:
a loading mechanism operable to load the incomplete group of objects received from the buffer location with an incomplete group of products onto a pallet; and
a routing mechanism operable to route the pallet to a storage location.

26. A sorting and sequencing system for mass-produced, customized objects, each of the objects being marked with a unique machine-readable code that includes, for each of the objects, group data and sequence data indicating a sequence position within a group, the system comprising:
a plurality of object carriers, each having a unique identity that associates each of the plurality of object carriers with one of the objects;
a code-reading mechanism operable to read the code on each of the objects, wherein the code-reading mechanism is operable to read the code on each of the objects and to associate each of the objects with the group data and the sequence data for that object;
a computer operatively coupled to the code-reading mechanism so as to map the code of each of the objects to the identity of an associated one of the plurality of object carriers;
a placement mechanism operatively associated with the computer and operable to place each of the objects on its associated object carrier using the code of each object and the identity of its associated object carrier;
an indexing table operable to receive a plurality of randomly-presented objects; and
an orientation mechanism operable to orient each of the objects on the indexing table into a desired orientation;
wherein the placement mechanism is operable to receive the oriented objects from the indexing table and to place each of the oriented objects on its associated object carrier;
a sorting mechanism responsive to the code-reading mechanism and operable to direct each of the objects into an assigned one of a plurality of buffer locations based on the group data of the object, thereby sorting the objects into a plurality of groups, each group of objects being held in an assigned buffer location; and
a sequencing mechanism responsive to the code-reading mechanism and operable to receive each group of objects from its assigned buffer location and to place each of the objects in each of the groups into a sequence based only on the sequence data of the objects;
wherein the sorting mechanism is operable, in response to the group data, to identify a group of objects in a buffer location as an incomplete group, the system further comprising a storing mechanism configured to receive an incomplete group of objects from a buffer location with an incomplete group of objects, to store the incomplete group of objects until a complete group is formed by further objects received from the buffer locations, and to send the complete group to the sequencing mechanism.

27. The sorting and sequencing system of claim 26, wherein:
the sorting mechanism is operable to direct each of the object carriers carrying an object into one of the plurality of buffer locations based on the group data of the object carried thereon, thereby sorting the object carriers into the plurality of groups, each group of object carriers being held in an assigned buffer location; and
the sequencing mechanism is operable to receive each group of object carriers from its assigned buffer location and to place each of the object carriers in each of the groups into a sequence based on the sequence data of the object carried thereon.

28. The sorting and sequencing system of claim 26:
wherein the code-reading mechanism is operable to associate each of the objects with an associated object carrier based on the group data and the sequence data;
wherein the sorting mechanism is operable to determine the unique identity of each of the object carriers and to direct each of the object carriers holding its associated object into one of the plurality of buffer locations based on an association of the unique identity of each of the object carriers with the group data of the object carried thereon; and
wherein the sequencing mechanism is operable to determine the unique identity of each of the object carriers and to place the object carriers in each of the carrier groups into a sequence based on an association of each of the object carriers in each of the carrier groups with the sequence data of the object carried thereon.

29. The sorting and sequencing system of claim 26, wherein the orientation mechanism comprises:
a vision station operable to determine whether the objects on the indexing table are in the desired orientation; and
an orienting device responsive to the vision station and operable to manipulate into the desired orientation objects that are determined not to be in the desired orientation.

* * * * *

UNITED STATES PATENT AND TRADEMARK OFFICE
CERTIFICATE OF CORRECTION

PATENT NO. : 11,247,242 B2  
APPLICATION NO. : 17/011577  
DATED : February 15, 2022  
INVENTOR(S) : Culp et al.

Page 1 of 1

It is certified that error appears in the above-identified patent and that said Letters Patent is hereby corrected as shown below:

In the Claims

In Column 12, in Claim 9, Line 65, delete "identify" and insert -- identity --, therefor.

In Column 13, in Claim 11, Line 17, delete "identify" and insert -- identity --, therefor.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*